United States Patent
Mori (10) Patent No.: US 11,182,461 B2
(45) Date of Patent: Nov. 23, 2021

(54) APPARATUS, SYSTEMS, AND METHOD FOR DETERMINING AUTHENTICATION

(71) Applicant: LENOVO (Singapore) PTE. LTD., New Tech Park (SG)

(72) Inventor: Mikako Mori, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 180 days.

(21) Appl. No.: 15/977,924

(22) Filed: May 11, 2018

(65) Prior Publication Data

US 2018/0330068 A1    Nov. 15, 2018

(30) Foreign Application Priority Data

May 11, 2017 (JP) .............................. JP2017-095013

(51) Int. Cl.

| | |
|---|---|
| *G06F 21/32* | (2013.01) |
| *G06F 3/03* | (2006.01) |
| *G06F 21/31* | (2013.01) |
| *G06F 11/34* | (2006.01) |
| *G06F 3/01* | (2006.01) |

(Continued)

(52) U.S. Cl.
CPC .............. *G06F 21/32* (2013.01); *G06F 3/012* (2013.01); *G06F 3/03* (2013.01); *G06F 3/0304* (2013.01); *G06F 3/038* (2013.01); *G06F 3/03547* (2013.01); *G06F 11/3438* (2013.01); *G06F 21/316* (2013.01)

(58) Field of Classification Search
CPC . G06F 21/32; G06F 3/012; G06F 3/03; G06F 3/0304; G06F 3/03547; G06F 3/038; G06F 11/3438; G06F 21/316
See application file for complete search history.

(56) References Cited

U.S. PATENT DOCUMENTS

| | | | |
|---|---|---|---|
| 10,482,225 B1 * | 11/2019 | Abdulhayoglu | ......... G07C 9/32 |
| 2003/0097593 A1 * | 5/2003 | Sawa | ....................... G06F 21/31 |
| | | | 726/4 |

(Continued)

FOREIGN PATENT DOCUMENTS

| | | |
|---|---|---|
| JP | 2003030154 A | 1/2003 |
| JP | 2007334637 A | 12/2007 |

(Continued)

*Primary Examiner* — Eleni A Shiferaw
*Assistant Examiner* — Stephanie S Ham
(74) *Attorney, Agent, or Firm* — Kunzler Bean & Adamson (57) ABSTRACT

Apparatus, systems, methods, and computer program products for determining an authentication procedure are disclosed. One apparatus includes a processor for an information handling device and a memory that stores code executable by the processor. The code is executable by the processor to detect either one of a usage state or a usage environment of the information processing device, select available authentication modules of a plurality of authentication modules in response to detecting either one of the usage state or the usage environment, wherein the authentication modules perform user authentication based on different information from one another, and inform a user of at least one of the available authentication modules selected in response to selecting the available authentication modules.

18 Claims, 8 Drawing Sheets

(51) Int. Cl.
*G06F 3/038* (2013.01)
*G06F 3/0354* (2013.01)

(56) References Cited

U.S. PATENT DOCUMENTS

| | | | | |
|---|---|---|---|---|
| 2012/0176413 | A1* | 7/2012 | Kulik | G06F 1/1694 |
| | | | | 345/659 |
| 2015/0128252 | A1* | 5/2015 | Konami | H04L 63/205 |
| | | | | 726/17 |
| 2015/0244696 | A1* | 8/2015 | Ma | H04L 67/42 |
| | | | | 726/4 |
| 2017/0111340 | A1* | 4/2017 | Gomi | H04L 63/08 |
| 2017/0374284 | A1* | 12/2017 | Shao | H04N 7/185 |
| 2018/0020350 | A1* | 1/2018 | Vissa | G06K 9/00006 |
| 2019/0036917 | A1* | 1/2019 | Sun | H04L 9/32 |

FOREIGN PATENT DOCUMENTS

| | | |
|---|---|---|
| JP | 2013-174955 A | 9/2013 |
| JP | 2017060103 A | 3/2017 |

\* cited by examiner

STAND MODE

STYLUS MODE

TABLET MODE

HANG MODE

APPARATUS, SYSTEMS, AND METHOD FOR DETERMINING AUTHENTICATION

CROSS-REFERENCE TO RELATED APPLICATIONS

This patent application claims priority to Japan Patent Application No. JP2017-095013, filed on 11 May 2017 for Mori, the entire contents of which are incorporated herein by reference for all purposes.

FIELD

The present disclosure relates to information processing devices, apparatus, systems, methods, and computer program products for determining an authentication procedure.

BACKGROUND

With the spread of portable information processing terminals such as smartphones and tablet terminals, various kinds of user authentication processes have been provided in information processing devices from the viewpoint of information security. For example, user authentication processes include face authentication using a camera provided in each information processing device for near-infrared (IR) imaging, fingerprint authentication using a fingerprint reader or the like, password authentication by key input, and the like. Each information processing device uses these authentication methods to identify a user who operates the information processing device (see Japanese Patent Application No. 2013-174955).

SUMMARY

Various embodiments provide apparatus and systems for determining authentication. Further embodiments provide methods and computer program products related to such apparatus and systems.

In one embodiment, an apparatus includes a processor for an information processing device and a memory that stores code executable by the processor. The code is executable by the processor to detect either one of a usage state or a usage environment of the information processing device, select available authentication modules of a plurality of authentication modules in response to detecting either one of the usage state or the usage environment, wherein the authentication modules perform user authentication based on different information from one another, and inform a user of at least one of the available authentication modules selected in response to selecting the available authentication modules.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Embodiments of information processing devices, apparatus, and systems for determining authentication are described with reference to the drawings. Also described are embodiments of methods and computer program products related to such apparatus and systems.

With the spread of portable information processing terminals such as smartphones and tablets, various kinds of user authentication processes have been utilized in information processing devices for providing information security. For example, user authentication processes include face authentication using a camera provided in each information processing device for near-infrared (IR) imaging. In another example, authentication processes include fingerprint authentication using a fingerprint reader or the like. In yet another example, authentication processes include password authentication by key input, and the like. Each information processing device uses these authentication methods to identify the user operating the information processing device.

However, authentication processes may have limitations in certain environments. For example, in face authentication, if the face of the user is outside the angle of view of the camera of the information processing device, face authentication cannot be performed. Like this example and others, in order to perform successful authentication there is a pre-condition based on the usage state or the usage environment of the information processing device sometimes unique to each authentication method. Therefore, when a user authentication process that does not meet the pre-condition is presented to the user, the user cannot perform authentication.

Figure 3:
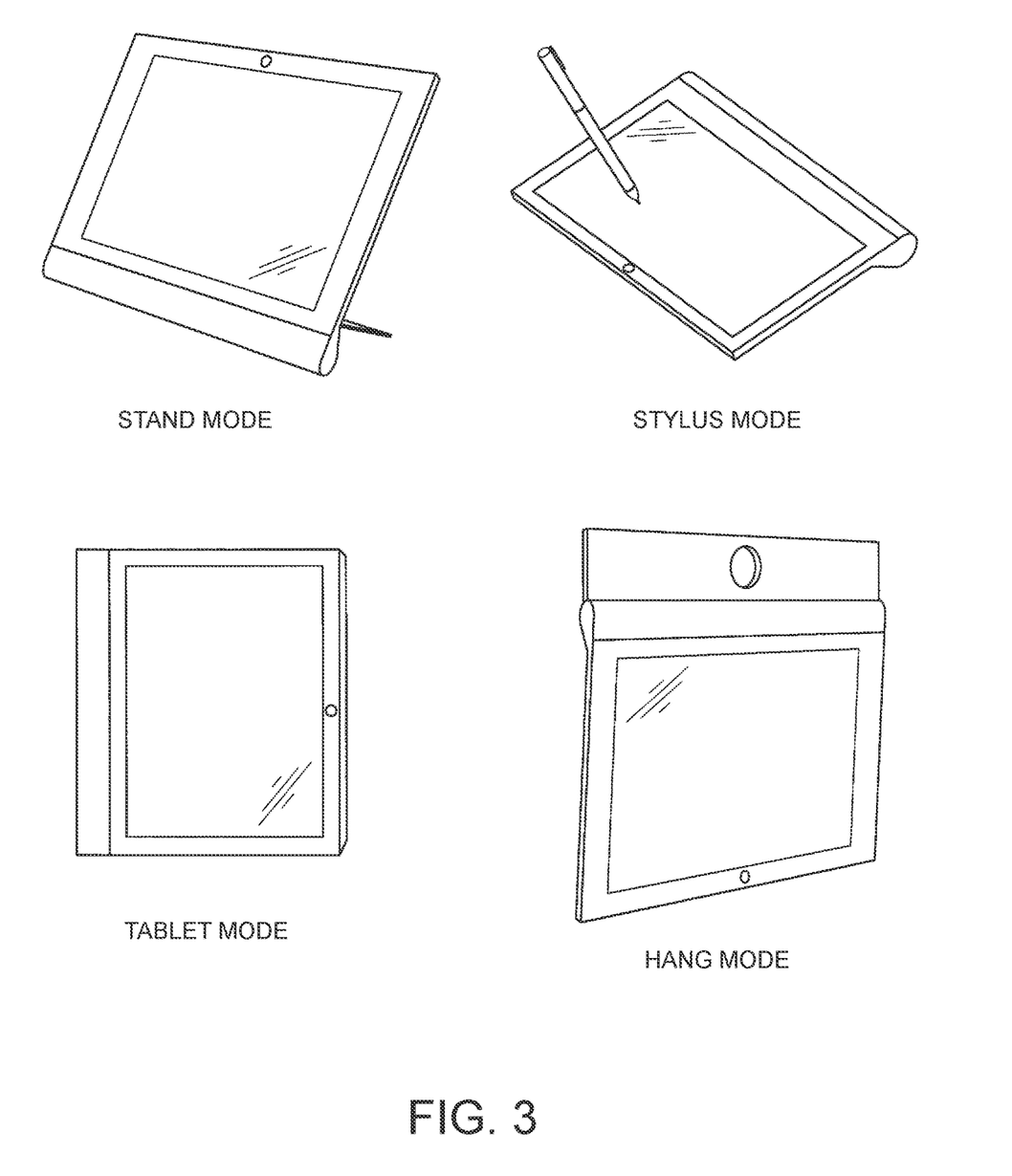
FIG. 3 is a block diagram illustrating use modes of the information processing device according to one or more embodiments of the present disclosure.

Further, for example, when two or more user authentication processes are provided in an information processing device equipped with a plurality of use modes such as a 2-in-1 personal computer (hereinafter abbreviated as "2-in-1 PC"), there is a possibility that a specific user authentication process cannot be operated normally depending on the use mode. Specifically, when the information processing device is used in a stylus mode as illustrated in FIG. 3, the direction of the camera becomes almost a directly-upward direction. In such a case or where the information processing device is flat on a desk or table, the face of a user cannot be captured with the angle of a camera provided in the information processing device. In such a scenario, face authentication cannot be used.

Some embodiments utilize a priority order. The priority order is the order of authentication methods to be presented to the user. In some embodiments, the priority order is preset to give highest priority to a user authentication process highest in security. In an example, the priority order may include face authentication, fingerprint authentication, and password authentication. The authentication processes are presented to the user in this order, for example. Without any determination of usage state or usage environment face authentication would be presented to a user even where the face authentication cannot be used. In this case, the user is required to switch the authentication method from face authentication to password authentication, resulting in requiring time and effort. Embodiments of the disclosure overcome such limitations.

The present disclosure has been made in response to the present state of the art, and in particular, in response to the problems and disadvantages associated with conventional fixtures that have not yet been fully solved by currently available techniques. It is an object of some embodiments to provide an information processing device, which provides, to a user, an available user authentication process preferentially, an authentication process determining method, and an authentication process determining program.

In order to solve the above and other problems, the present disclosure adopts the following features in one or more embodiments.

According to one or more embodiments of the present disclosure, there is provided an information processing device including a plurality of authentication modules which perform user authentication based on information different from one another. The information processing device further includes a detection module which may be configured to detect either one of the usage state and the usage environment of the information processing device. The information processing device further includes a selection module which may be configured to select available authentication modules in response to detecting either one of the usage state and the usage environment of the information processing device. The information processing device further includes an informing module which may be configured to inform a user of at least one of the authentication modules selected by the selection module.

According to one or more embodiments of the present disclosure, there is provided an apparatus including a processor for an information handling device and a memory that stores code executable by the processor. The code is executable by the processor to detect either one of a usage state or a usage environment of the information processing device, select available authentication modules of a plurality of authentication modules in response to detecting either one of the usage state or the usage environment, wherein the authentication modules perform user authentication based on different information from one another, and inform a user of at least one of the available authentication modules selected in response to selecting the available authentication modules.

According to one or more embodiments of the present disclosure, there is provided an authentication process determining method including: detecting either one of the usage state and the usage environment of an information processing device; using the detection result of the detection step to select available authentication processes; and informing a user of at least one of the authentication processes selected in the selection step.

According to one or more embodiments of the present disclosure, there is provided a method including: detecting either one of a usage state or a usage environment of the information processing device; selecting available authentication processes of a plurality of authentication processes in response to detecting either one of the usage state or the usage environment, wherein the authentication processes perform user authentication based on different information from one another; and informing a user of at least one of the available authentication processes selected in response to selecting the available authentication processes.

According to one or more embodiments of the present disclosure, there is provided an authentication process determining program causing a computer to execute: a plurality of authentication processes of performing user authentication based on information different from one another; a detection process of detecting either one of the usage state and the usage environment of an information processing device; a selection process of using the detection result of the detection process to select available authentication processes; and an informing process of informing a user of at least one of the authentication processes selected in the selection process.

According to one or more embodiments of the present disclosure, there is provided program product including a computer-readable storage medium that stores code executable by a processor, the executable code comprising code to perform: detecting, by use of a processor, either one of a usage state or a usage environment of the information processing device; selecting available authentication processes of a plurality of authentication processes in response to detecting either one of the usage state or the usage environment, wherein the authentication processes perform user authentication based on different information from one another; and informing a user of at least one of the available authentication processes selected in response to selecting the available authentication processes.

According to the above-described aspects of the present disclosure, an available user authentication process can be provided to the user preferentially depending on either a usage state or a usage environment.

Figure 1:
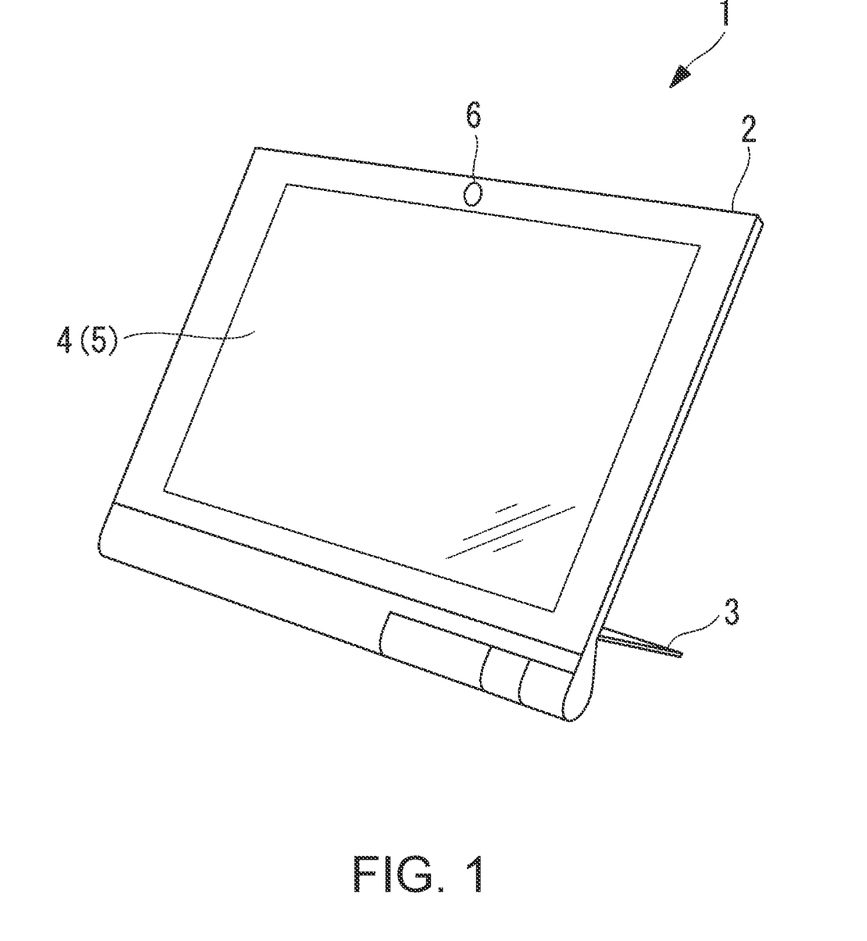
FIG. 1 is a schematic external view according to one or more embodiments of the present disclosure.

Referring to FIG. 1, an information processing device 1 according to the present disclosure is shown. The information processing device 1 will be described below with reference to the accompanying drawings. FIG. 1 is a schematic external view of an information processing device 1 according to one or more embodiments of the disclosure. In the description below, examples of embodiments of the information processing device 1 are described, including a PC having plural use modes as in FIG. 3. Note that the information processing device 1 is not limited to the PC having the plural use modes as in FIG. 3, and it may be an information processing terminal having other use modes, such as an information processing terminal with a display unit rotatable 360 degrees, slidable, and detachable, or a so-called one role per one device type information processing terminal, such as a laptop PC, a tablet, or a smartphone.

Furthermore, the described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure.

In some embodiments, the use mode is defined by the tilt angle of the information processing device 1. In some embodiments, the use mode is defined by the direction of each of chassis, coupled to each other to constitute the information processing device 1, with respect to the direction of gravity thereof, the angle of each chassis to another chassis, a coupled state of each chassis to another chassis, or a combination thereof.

As illustrated in FIG. 1, the information processing device 1 includes, as an example, a body-side chassis 2 having a substantially rectangular parallelepiped shape and a support chassis 3.

The body-side chassis 2 includes a display unit 4 which displays images. In some embodiments, the display unit 4 is a Liquid Crystal Display (LCD). The display unit 4 is not limited to an LCD, and it may be, in other embodiments, any other display such as an organic Electroluminescent display (ELD), an organic light-emitting diode display (OLED), a plasma display panel (PDP), etc. An LCD converts input display data to a video signal to display, on a display screen, various pieces of information corresponding to the converted video signal.

The body-side chassis 2 also includes an input unit 5. The input unit 5 is a user interface which allows a user to perform input operations. In some embodiments, the input unit 5 constitutes a touch panel together with the display unit 4. The touch panel may be of capacitance type, resistance film type, or the like. In the case of the touch panel, for example, a keyboard composed of various keys used to enter characters, commands, and the like is displayed on the LCD so that various input operations will be performed according to respective areas of the touch panel corresponding to respective keys on the keyboard displayed. In other embodiments, other types of input devices may be used that are separate from the display unit 4.

Figure 2:
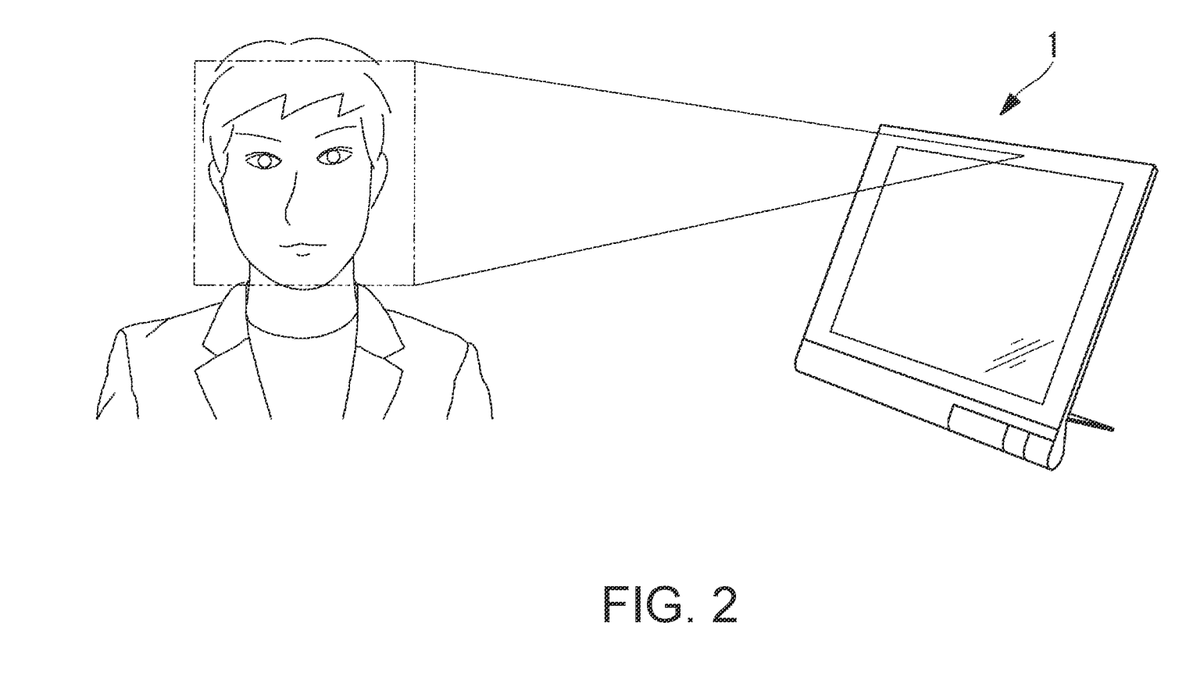
FIG. 2 is a diagram illustrating face authentication on an information processing device according to one or more embodiments of the present disclosure.

Referring again to FIG. 1, the body-side chassis 2 includes a camera 6. The camera 6 is arranged substantially at the center on the upper side of the display unit 4 of the body-side chassis 2 so that a front subject can be captured. In the embodiment, an IR camera is exemplified as the camera 6 to be used for a user authentication method, but the camera 6 may also be a three-dimensional camera, an IRIS camera, or another type of camera known. In the embodiment illustrated in FIG. 2, capturing is performed so that the face of a user will be fitted into the angle of view of the camera 6. The face capture may be used to perform user authentication. Note that the installation position of the camera 6 is not limited to the position illustrated in FIG. 1. Other embodiments may include a camera positioned in a different position on the information processing device 1. Further, some embodiments may not include a camera 6 and may utilize other authentication processes.

In some embodiments, the support chassis 3 is coupled to the body-side chassis 2 to be rotatable three hundred and sixty degrees with respect to the body-side chassis 2. Referring to FIG. 1, the support chassis 3 is coupled to the body-side chassis 2. In other embodiments the support chassis 3 may be detachable, slidable, and the like.

The information processing device 1 according to some embodiments can be used in various usage states and usage environments. For example, the information processing device 1 has a plurality of use modes switchable from one to another, for example, by rotating the support chassis 3 with respect to the body-side chassis 2. As an example, the use mode switches depending on the rotation of the support chassis 3.

Figure 4:
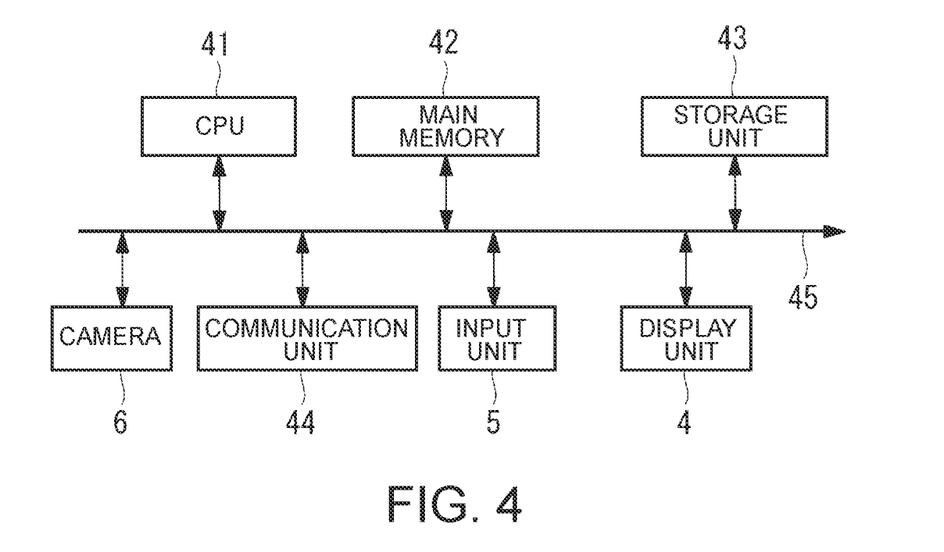
FIG. 4 is a diagram illustrating the hardware configuration according to one or more embodiments of the present disclosure.

FIG. 4 is a diagram illustrating the hardware configuration of the information processing device 1 according to the first embodiment of the present invention. For example, the information processing device 1 includes a CPU (Central Processing Unit) 41, a main memory 42, a storage unit 43, the display unit 4, the input unit 5, a communication unit 44, and the camera 6. These units are connected to one another directly or indirectly through a bus 45.

In some embodiments, the CPU 41 controls the information processing device 1 according to an operating system (OS) stored in the storage unit 43 connected, for example, through the bus 45. In some embodiments, the CPU 41 executes various programs stored in the storage unit 43 to execute various processes such as an the methods described herein.

In some embodiments, the main memory 42 is composed of writable memories such as a cache memory and a RAM (Random Access Memory). In some embodiments, the main memory 42 is used as a working area to read an execution program of the CPU 41, write data processed by an execution program, and the like.

The storage unit 43 is, for example, composed of a ROM (Read Only Memory), and an HDD (Hard Disk Drive), a flash memory, and the like to store the OS for controlling the information processing device 1, such as Windows (registered trademark), iOS (registered trademark), or Android (registered trademark), various drivers used to perform hardware operations of peripheral devices, applications for use in specific business, various data and files, and the like. Further, in the storage unit 43, a program to execute an authentication process determining process described herein and various data necessary to execute the authentication process determining process are stored.

The display unit 4 is, for example, an LCD to provide a display under the control of the CPU 41. The input unit 5 is, for example, a touch panel used by the user performing input operations to areas of the touch panel corresponding to a keyboard and the like displayed on the display unit 4.

In some embodiments, the communication unit 44 is an interface to connect to a network so as to communicate with another information processing device 1 in order to exchange information.

The camera 6 is, for example, controlled by the CPU 41 based on user's input operations and the like. In some embodiments, image data acquired from the camera 6 are used by the CPU 41 to perform user authentication.

Figure 5:
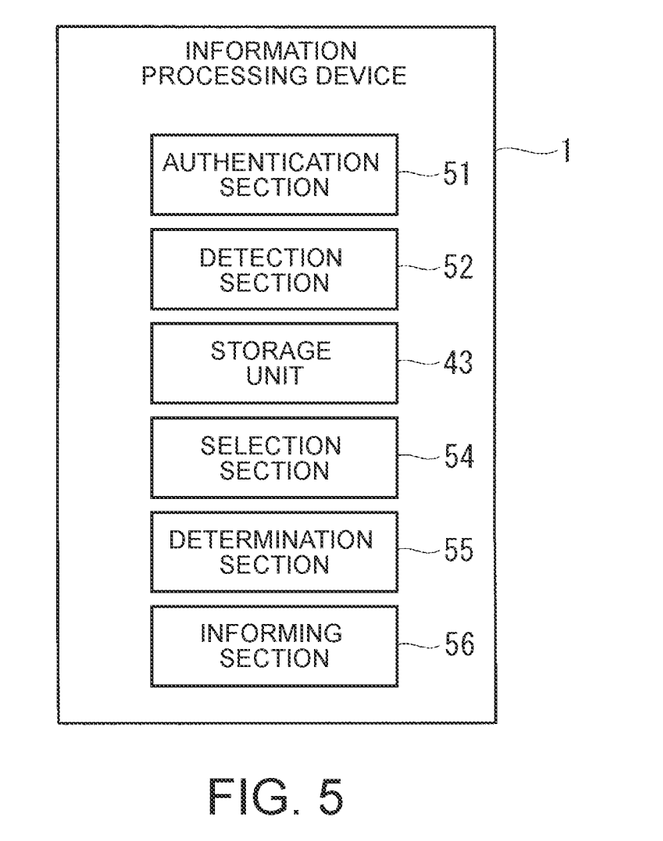
FIG. 5 is a block diagram illustrating a schematic configuration of the information processing device according to one or more embodiments of the present disclosure.

FIG. 5 is a functional block diagram illustrating an example of the functions of the information processing device 1. As illustrated in FIG. 5, for example, the information processing device 1 includes, as main components, an authentication module 51, a detection module 52, the storage unit 43, a selection module 54, a determination module 55, and an informing module 56. Various processes described herein, which are implemented by these modules, are implemented, for example, by the CPU 41 of the information processing device 1 reading an authentication process determining program stored in the storage unit 43 into the main memory 42 and executing the authentication process determining program. For example, the authentication process determining program stored in the main memory 42 or the storage unit 43 may be a program downloaded from a predetermined server or installed and stored from a predetermined recording medium, or a program stored in the storage unit 43 at the time of manufacturing. The various processes for mode detection in the information processing device 1 to be described later are implemented by the functions of the authentication process determining program.

In some embodiments, the authentication module 51 performs user authentication. The information processing device 1 includes a plurality of authentication modules 51 to perform user authentication based on information different from one another. In an example, description will be made by taking, as an example, a case where the information processing device 1 is equipped with two kinds of user authentication methods, i.e., face authentication to perform user authentication based on information acquired by the IR camera, and password authentication to perform user authentication by password input. Note that other authentication methods may be combined, such as face authentication using a three-dimensional camera or the like, fingerprint authentication using a fingerprint reader or the like, biometric authentication, such as iris authentication using an IRIS camera or the like, voiceprint authentication, and vein authentication, and card authentication.

The detection module 52 detects at least either one of the usage state and usage environment of the information processing device 1. In an embodiment, the detection module 52 detects the usage state of the information processing device 1. In an example, the usage state of the information processing device 1 includes the direction or angle at which the information processing device 1 is used. Specifically, in some embodiments, the detection module 52 uses an acceleration sensor or accelerometer to detect an angle between the surface of the camera 6 provided in the information processing device 1 and a plane perpendicular to the direction of gravity in order to estimate the usage state of the information processing device 1. It is noted that the method of detecting a use mode is not limited to the case of using the accelerometer, and the usage state of the information processing device 1 may also be estimated by using an angle sensor, a geomagnetic sensor, or the like.

In the storage unit 43, available authentication information may be stored. In some embodiments, each of the available authentication processes corresponds to a range of tilt angles of the information processing device 1 with respect to a predetermined reference plane. Such information is stored in the storage unit 43. Specifically, available authentication information in which an angle range between the surface of the camera 6 of the information processing device 1 and the plane perpendicular to the direction of gravity is associated with each available authentication method and is stored in the storage unit 43. As an example, there are angle ranges of the camera 6 provided in the information processing device 1 in which the face of the user is not fitted into the angle of view of the camera 6 (hereinafter simply called "angle"). This may be determined based on the angle between the installation surface of the camera 6 and the plane perpendicular to the direction of gravity. For example, when the angle is 0 degrees, since the shooting direction of the camera 6 is substantially a directly-upward direction, the face of the user cannot be shot and authenticated.

Figure 6:
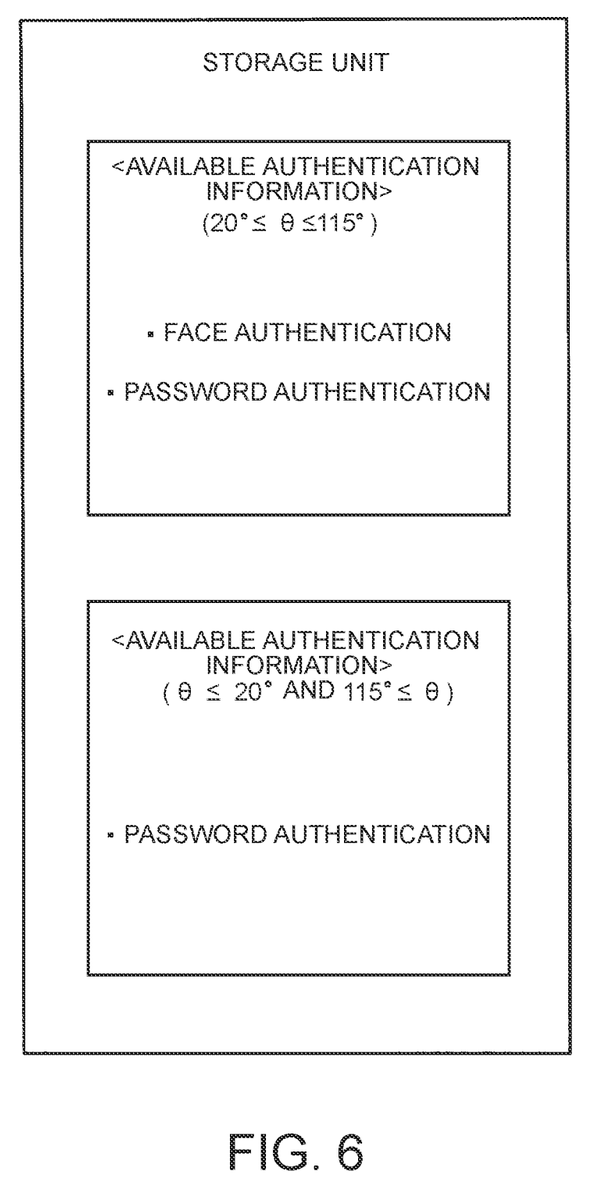
FIG. 6 is a block diagram illustrating a schematic configuration of a storage unit according to one or more embodiments of the present disclosure.

In some embodiments, for example, the available authentication information is such that, in an angle range of not less than 20 degrees and not more than 115 degrees, as illustrated in FIG. 6, face authentication and password authentication are registered as available authentication methods, while in the other ranges, password authentication is registered because it is estimated that the face of the user cannot be shot with the camera 6 as described above.

In some embodiments, the selection module 54 selects an available authentication process(es) using the detection results of the detection module 52. Specifically, an available authentication process(es) is selected by using the angle detected by the detection module 52 and available authentication information stored in the storage unit 43. In some embodiments, when the angle detected by the detection module 52 falls within the angle range of not less than 20 degrees and not more than 115 degrees, face authentication and password authentication described in corresponding available authentication information are selected as available authentication processes. On the other hand, when the angle detected by the detection module 52 falls beyond the angle range of not less than 20 degrees and not more than 115 degrees, password authentication is selected as an available authentication method.

Although in such a state that the direction of the camera 6 faces substantially upward is detected as the usage state of the information processing device 1, the present disclosure is not limited thereto. The selection module 54 can select an available authentication method by setting a condition in advance based on the usage state of the information processing device 1 estimated to be unavailable to each authentication process, and storing, in the storage unit 43, an authentication method estimated to be available according to each condition as available authentication information. Angle ranges can be stored in advance and/or adjusted in some embodiments.

In some embodiments, the determination module 55 selects any one of the authentication modules 51 selected by the selection module 54. Then, the authentication method selected to be the one is output to the informing module 56. In some embodiments, one authentication method is determined by the determination module 55, but when the informing module 56 informs the user of two or more authentication processes together, the two or more authentication processes may be determined from among available authentication processes selected by the selection module 54.

Further, a priority order of the available authentication methods may be set as available authentication information stored in the storage unit 43. In this case, the determination module 55 determines one authentication method based on the priority order from among the authentication methods selected by the selection module 54.

The informing module 56 informs the user of the authentication process determined by the determination module 55. Specifically, the available authentication process determined by the determination module 55 is presented to the user to guide the user to perform authentication by the determined authentication process. For example, the available authentication process may be informed to the user by using a visual method, such as to display the available authentication process as a message on a screen, inform the user by using a speech-based auditory method, or as a combination of these methods. When two or more available authentication processes are determined by the determination module 55, the informing module 56 may inform the user of the two or more authentication processes together to cause the user to select an authentication process. Further, when one available authentication process is informed to the user, if an operation to switch between authentication processes is performed by the user, the informing module 56 may present, to the user, any authentication process other than the authentication process already presented among the two or more available authentication processes selected by the selection module 54.

Figure 7:
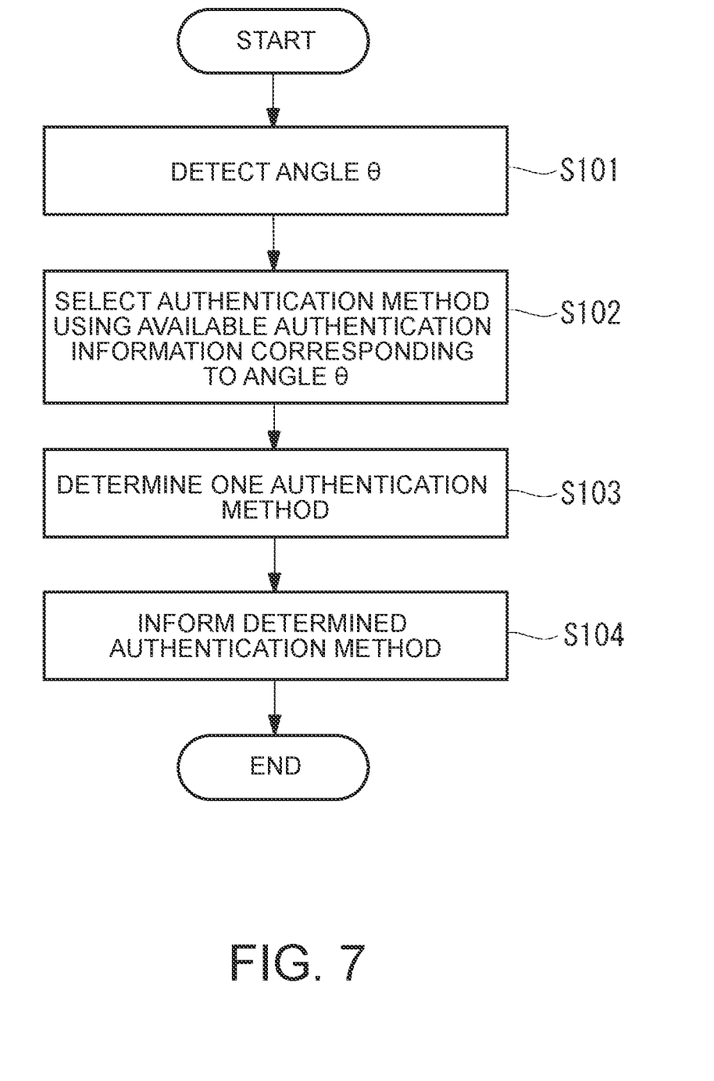
FIG. 7 is a flowchart according to one or more embodiments of the present disclosure.

Next, an authentication process determining process carried out by the information processing device 1 according to the embodiment will be described. FIG. 7 is a flowchart illustrating a procedure for the authentication process determining method carried out by the information processing device 1 according to some embodiments. For example, a processing flow illustrated in FIG. 7 is started when the information processing device 1 is released from a sleep state or when the information processing device 1 is started up.

When the information processing device 1 is in the sleep state and the sleep state of the information processing device 1 is released by the user, the angle is detected by the detection module 52 as the usage state of the information processing device 1 (S101).

Then, according to the angle detected by the detection module 52, authentication methods are selected by the selection module by using available authentication information corresponding to the angle within the angle range of not less than 20 degrees and not more than 115 degrees, or available authentication information corresponding to the angle beyond the angle range of not less than 20 degrees and not more than 115 degrees (S102).

After completion of the selection of the authentication processes, one authentication process to be presented to the user is determined by the determination module 55 (S103).

When one authentication process to be presented to the user is determined, the determined authentication process is informed to the user by the informing module 56 (S104).

The user performs authentication such as login by the authentication process informed.

As described above, according to the information processing device 1 of the embodiment, since the authentication process determining method, and the authentication process determining program, since an available authentication process is selected and informed automatically according to the usage state of the information processing device 1 when the user performs authentication such as login, the user can perform authentication efficiently without such an inconvenience that an unavailable authentication process is presented to the user.

For example, when the information processing device 1 is used in the stylus mode illustrated in FIG. 3, since the angle of the camera 6 provided in the information processing device 1 is less than 20 degrees, the shooting direction of the camera 6 always faces substantially directly upward in the stylus mode and hence the face of the user is estimated not to be fitted into the angle of view of the camera 6.

Therefore, in the embodiment, an angle between the installation surface of the camera 6 provided in the information processing device 1 and the plane perpendicular to the direction of gravity is detected as the usage state of the information processing device 1 to select authentication processes based on the angle. Alternatively, available authentication processes may also be selected based on the use mode of the information processing device 1. Specifically, available authentication information in which each available authentication process is registered for each use mode is stored in the storage unit 43. In this case, for example, the usage state of the information processing device 1 is set in advance by being divided into plural use modes as in FIG. 3, and an available authentication process is stored for each use mode in the storage unit 43 as available authentication information. For example, as in FIG. 8, the use mode is divided into the stand mode and the stylus mode, and authentication processes estimated to be available in respective modes are stored as available authentication information.

Figure 8:
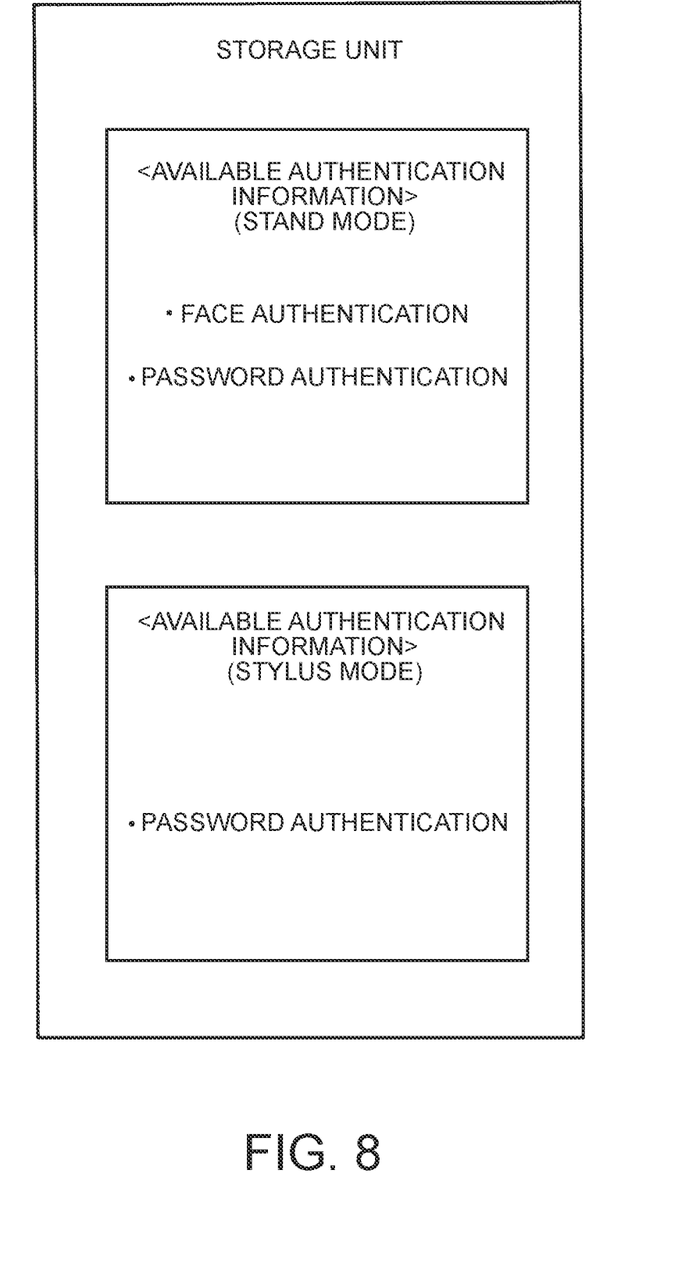
FIG. 8 is a block diagram illustrating a schematic configuration of a storage unit according to one or more embodiments of the present disclosure.

Since an available authentication process(es) is registered for each use mode in advance as available authentication information, the detection module 52 detects the use mode of the information processing device 1 as the usage state of the information processing device 1. In order to detect the use mode, the detection module 52 may use the accelerometer or the like to detect the direction or tilt of the information processing device 1 so as to estimate the use mode of the information processing device 1, or when the use mode being selected in the information processing device 1 is already recorded, this information may be read to figure out the use mode.

Then, the selection module 54 selects available authentication processes by using the use mode of the information processing device 1 detected by the detection module 52 and the available authentication information.

For authentication processes registered as available authentication information, the priority order may be set according to the respective authentication processes. When the priority order is set, the determination module 55 may determine one authentication process based on the priority order.

Further, the priority order set based on the authentication processes as available authentication information may be set according to the security levels of the respective authentication processes. Note that the priority order is not limited to the order based on the security levels. The priority order may be set by user in advance or by a manufacturer before shipment.

Thus, the priority order is set for the available authentication information according to the authentication processes. Therefore, for example, since the user can set the order of authentication processes freely and the available authentication processes are automatically sorted out and presented in the set order, it can be expected to improve usability.

Further, when the priority order is set according to the security levels, since an authentication process available and high in security level is preferentially provided to the user, the authentication security and the convenience of the user can be balanced.

An information processing device 1 according to a second embodiment of the present invention will be described below.

The same components as those in the first embodiment are given the same reference numerals to omit redundant description. In the following, only different points will be mainly described.

In the first embodiment, the case where the detection module 52 detects the usage state of the information processing device 1 is described, while in the second embodiment, the detection module 52 detects the usage environment of the information processing device 1. Specifically, the storage unit 43 stores available authentication information in which each available authentication process is registered for each usage environment pattern of the information processing device 1. Then, the detection module 52 detects a usage environment pattern of the information processing device 1 as the usage environment of the information processing device 1. Using the usage environment pattern of the information processing device 1 detected by the detection module 52 and the available authentication information, the selection module 54 selects available authentication processes.

The usage environment is an ambient environment in which the information processing device 1 is used. As an example, the usage environment includes the illumination intensity, temperature, ultraviolet ray, noise, and electromagnetic field around the information processing device 1 used, and vibration, and the like, applied to the information processing device 1.

The usage environment pattern is defined by using at least one parameter condition on the usage environment of the information processing device 1. In the embodiment, the illumination intensity is used as the parameter of the usage environment pattern, and a parameter condition is whether the illumination intensity level is a level capable of successfully shooting the face of the user with the camera 6 provided in the information processing device 1. Therefore, in the embodiment, two usage environment patterns are provided for each parameter condition. When the ambient illumination intensity corresponds to one usage environment pattern where the illumination intensity reaches the illumination intensity level capable of successfully shooting the face of the user, face authentication can be performed successfully, while when the ambient illumination intensity corresponds to the other usage environment pattern where the illumination intensity does not reach the illumination intensity level capable of successfully shooting the face of the user, face authentication cannot be performed.

In the storage unit 43, available authentication information in which an authentication process available for each usage environment pattern described above is stored. Specifically, in the usage environment pattern where the ambient illumination intensity reaches the illumination intensity level capable of successfully shooting the face of the user, face authentication and password authentication are registered as available authentication processes. On the other hand, in the usage environment pattern where the ambient illumination intensity does not reach the illumination intensity level capable of successfully shooting the face of the user, password authentication is registered as an available authentication process. For example, as in FIG. 9, when the illumination intensity level capable of successfully shooting the face of the user is denoted by a, respective pieces of available authentication information are set for the two usage environment patterns based on the illumination intensity level a.

Figure 9:
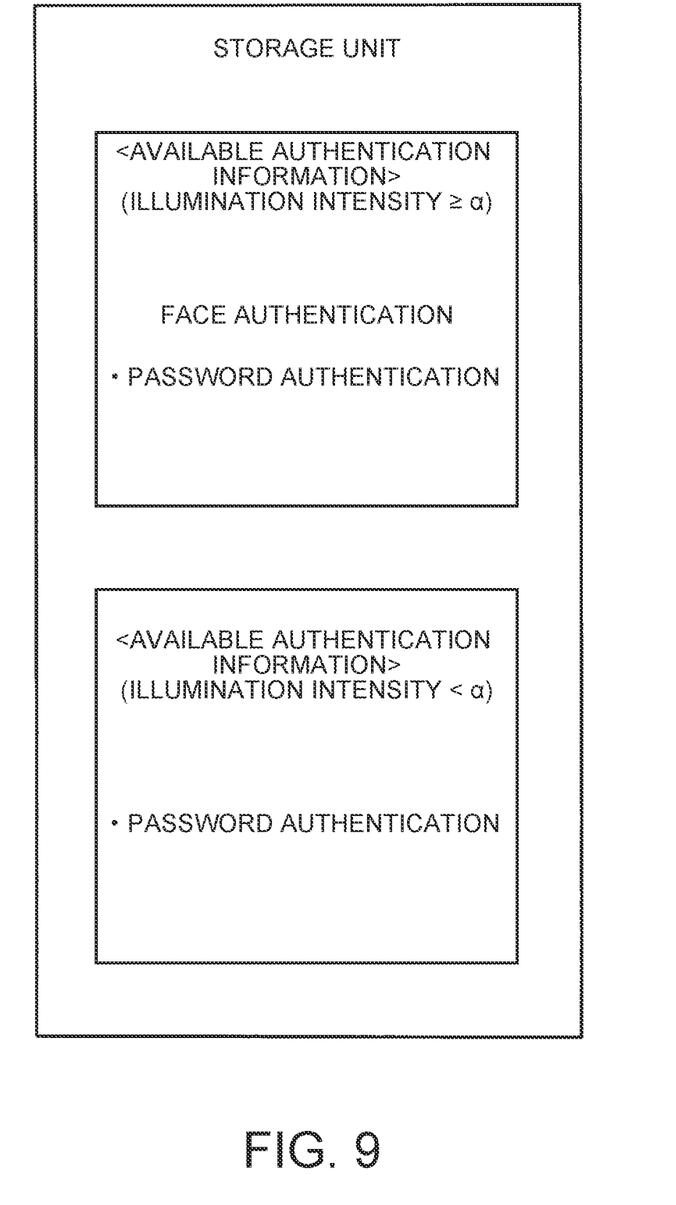
FIG. 9 is a block diagram illustrating a schematic configuration of a storage unit according to one or more embodiments of the present disclosure.

Then, based on the available authentication information on the usage environment pattern corresponding to the value of illumination intensity detected by the detection module 52, the selection module 54 selects available authentication processes. Thus, when the ambient illumination intensity reaches the illumination intensity level capable of successfully shooting the face of the user, the selection module 54 selects face authentication and password authentication, while when the ambient illumination intensity does not reach the illumination intensity level capable of successfully shooting the face of the user, the selection module 54 selects password authentication. Then, at least one of these available authentication processes selected by the selection module 54 is determined by the determination module 55 and informed by the informing module 56.

As described above, according to the embodiment, when the surroundings of the information processing device 1 are bright, face authentication and password authentication are presented to the user, while when it is dark around the information processing device 1, password authentication is presented to the user. This can prevent unavailable authentication from being presented to the user, and hence the usability of the user can be improved.

Note that the usage environment of the information processing device 1 is not limited to such a condition that the information processing device 1 is used in a dark place, and the usage environment can also be applied to various environmental factors, such as light, sound, and electromagnetic wave, around the information processing device 1. Depending on the authentication process used, at least one parameter can be used for an environment in which the authentication process is estimated not to be available, and hence the environment can be defined while being divided into a usage environment pattern. Thus, an available authentication module can be provided to the user preferentially with the same operation as mentioned above.

Further, the first embodiment and the second embodiment are not limited to the above-described authentication processes, and the usage state and the usage environment, and the present invention can be applied to various other authentication processes, and the usage state and usage environment, that is, they may be changed or combined. In other words, available authentication processes may also be selected in combination of the usage state and the usage environment.

Although various embodiments have been described herein, the technical scope of the various embodiments are not limited to the scope specifically described above. That is, various modifications and/or improvements may be made to the various embodiments without departing from the spirit of this disclosure. As such, embodiments in which modifications and/or improvements have been made are also included in the technical scope of the various embodiments.

The foregoing description has been directed to various embodiments illustrated in the drawings. The scope of the various embodiments, however, is not limited to the illustrated embodiments, and may, of course, employ any known configuration as long as the advantages of the various embodiments can be obtained. Furthermore, the flow of the methods described in the above embodiments are merely an example, and an unnecessary block may be deleted, a new block may be added, and/or a processing order may be changed without departing from the spirit of the method.

What is claimed is:
1. An apparatus, comprising:
a processor of an information processing device; and
a memory that stores code executable by the processor to:
detect, prior to obtaining information from a user for authenticating the user, either one of a usage state or a usage environment of the information processing device, wherein the usage state is determined based on an angle between a surface of the information processing device and a plane perpendicular to a direction of gravity, and the usage environment is determined based on an illumination intensity, a temperature, an ultraviolet ray, a noise, an electromagnetic field, a vibration, or some combination thereof;
select, by the processor prior to obtaining information from the user for authenticating the user, available authentication modules of a plurality of authentication modules based on the usage state or the usage environment of the information processing device detected, wherein the authentication modules perform user authentication based on different information from one another;

prioritize the available authentication modules based on a priority level of each authentication module of the available authentication modules;

inform the user of at least two available authentication modules of the available authentication modules, wherein a highest priority authentication module of the at least two available authentication modules is identified to the user and the at least two available authentication modules are available for selection by the user, and the highest priority authentication module of the at least two available authentication modules that is identified to the user has a highest security of the at least two available authentication modules; and inhibit unavailable authentication modules from being presented to the user.

2. The apparatus of claim 1, further comprising a storage unit configured to store available authentication information in which each of the available authentication modules is defined with respect to a tilt angle of the information processing device.

3. The apparatus of claim 1, wherein:
the code is further executable by the processor to detect a tilt angle of the information processing device; and
the usage state comprises the tilt angle.

4. The apparatus of claim 3, wherein the available authentication modules are selected in response to the detected tilt angle and available authentication information.

5. The apparatus of claim 1, wherein the code is further executable by the processor to detect a use mode of the information processing device.

6. The apparatus of claim 5, wherein the available authentication modules are selected in response to the detected use mode and available authentication information.

7. The apparatus of claim 1, wherein the code is further executable by the processor to detect a usage environment pattern of the information processing device.

8. The apparatus of claim 7, wherein the available authentication modules are selected in response to the detected usage environment pattern of the information processing device.

9. The apparatus of claim 8, wherein the usage environment pattern is a pattern obtained by defining the usage environment of the information processing device using at least one parameter condition.

10. The apparatus of claim 1, wherein the code is further executable by the processor to detect an illumination intensity around the information processing device, wherein the illumination intensity is the usage environment.

11. The apparatus of claim 10, wherein the available authentication modules are selected in response to the detected illumination intensity around the information processing device.

12. The apparatus of claim 10, wherein the code is further executable by the processor to select an authentication module based on a priority order set to available authentication information, wherein the priority order is set according to a security level of the authentication modules.

13. A method, comprising:
detecting, prior to obtaining information from a user for authenticating the user, either one of a usage state or a usage environment of an information processing device, wherein the usage state is determined based on an angle between a surface of the information processing device and a plane perpendicular to a direction of gravity, and the usage environment is determined based on an illumination intensity, a temperature, an ultraviolet ray, a noise, an electromagnetic field, a vibration, or some combination thereof;

selecting, by an apparatus prior to obtaining information from the user for authenticating the user, available authentication processes of a plurality of authentication processes based on the usage state or the usage environment of the information processing device detected, wherein the authentication processes perform user authentication based on different information from one another;

prioritizing the available authentication processes based on a priority level of each authentication process of the available authentication processes;

informing the user of at least two available authentication processes of the available authentication processes, wherein a highest priority authentication process of the at least two available authentication processes is identified to the user and the at least two available authentication processes are available for selection by the user, and the highest priority authentication module of the at least two available authentication modules that is identified to the user has a highest security of the at least two available authentication modules; and inhibiting unavailable authentication processes from being presented to the user.

14. The method of claim 13, further comprising:
detecting a tilt angle of the information processing device; and
selecting the available authentication processes in response to the detected tilt angle and available authentication information.

15. The method of claim 13, further comprising:
detecting a use mode of the information processing device; and
selecting the available authentication processes in response to the detected use mode and available authentication information.

16. The method of claim 13, further comprising:
detecting an illumination intensity around the information processing device; and
selecting the available authentication processes in response to the detected illumination intensity and available authentication information.

17. A program product comprising a non-transitory computer-readable storage medium that stores code executable by a processor, the executable code comprising code to perform:
detecting, by use of a processor and prior to obtaining information from a user for authenticating the user, either one of a usage state or a usage environment of an information processing device, wherein the usage state is determined based on an angle between a surface of the information processing device and a plane perpendicular to a direction of gravity, and the usage environment is determined based on an illumination intensity, a temperature, an ultraviolet ray, a noise, an electromagnetic field, a vibration, or some combination thereof;

selecting, by use of the processor prior to obtaining information from the user for authenticating the user, available authentication processes of a plurality of authentication processes based on the usage state or the usage environment of the information processing device detected, wherein the authentication processes perform user authentication based on different information from one another;

prioritizing the available authentication processes based on a priority level of each authentication process of the available authentication processes;

informing the user of at least two available authentication processes of the available authentication processes, wherein a highest priority authentication process of the at least two available authentication processes is identified to the user and the at least two available authentication processes are available for selection by the user, and the highest priority authentication module of the at least two available authentication modules that is identified to the user has a highest security of the at least two available authentication modules; and inhibiting unavailable authentication processes from being presented to the user.

18. The program product of claim 17, wherein the executable code further comprises code to perform:

detecting a tilt angle of the information processing device;

detecting a use mode of the information processing device;

detecting an illumination intensity around the information processing device; and selecting the available authentication processes in response to the detected tilt angle, detected use mode, and detected illumination intensity and available authentication information.

\* \* \* \* \*